UNITED STATES PATENT OFFICE.

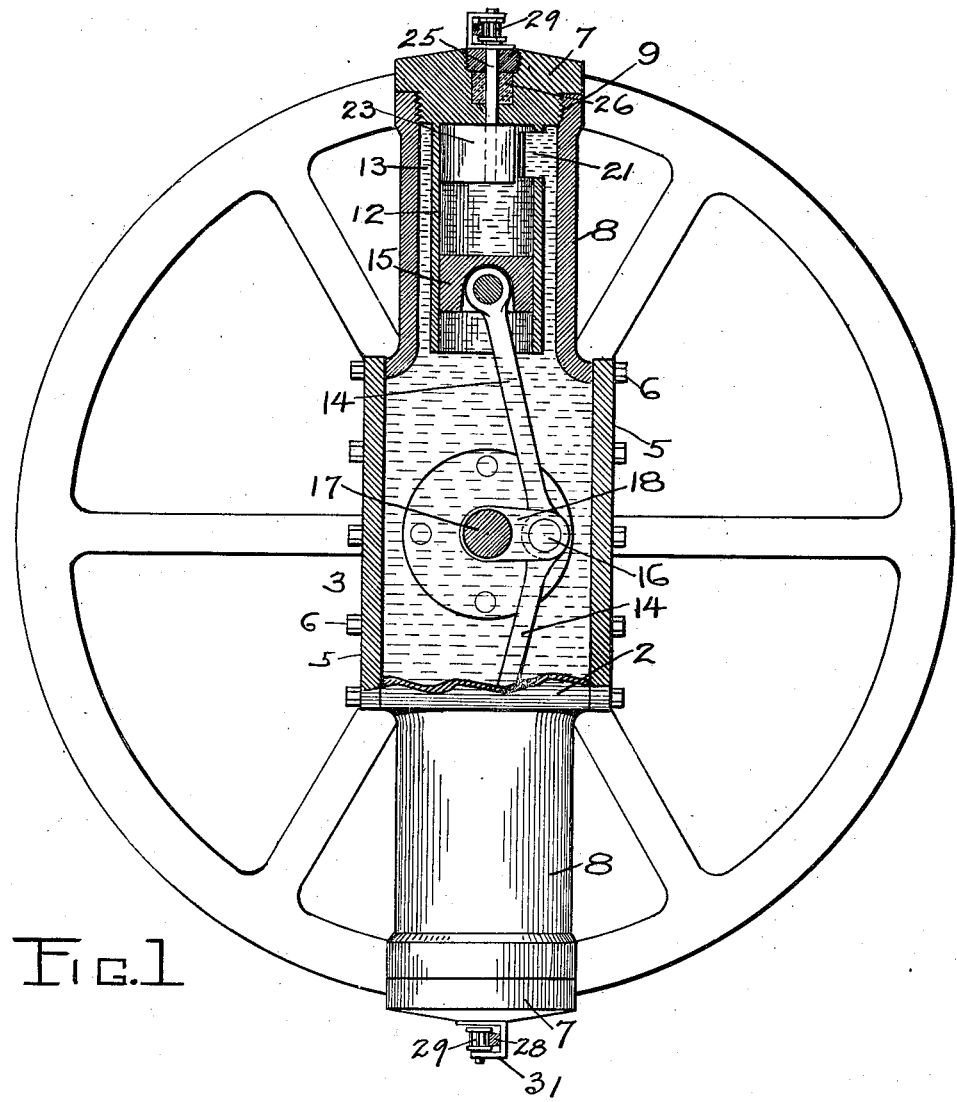

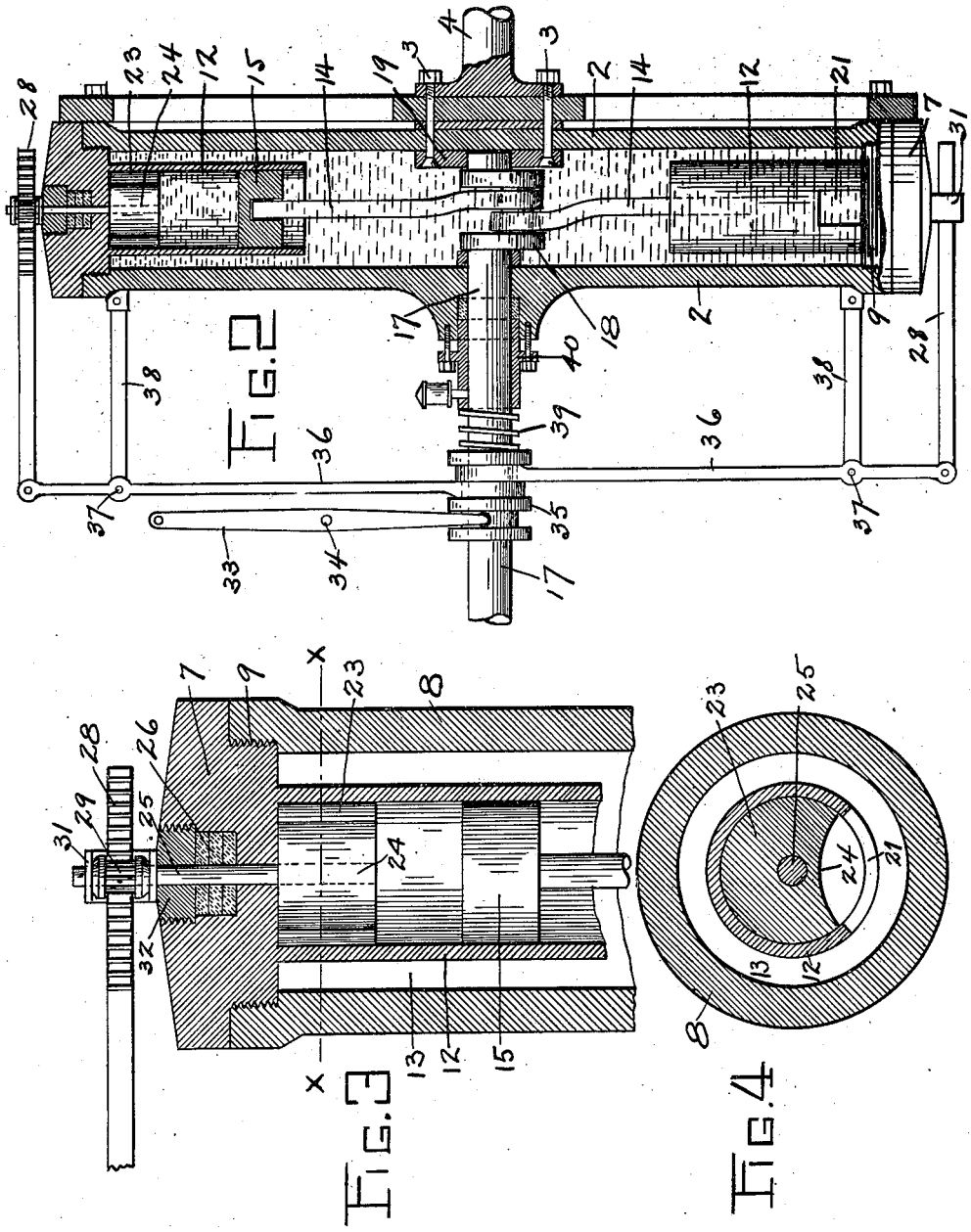

JULIUS C. W. JÖRGENSEN, OF SAN FRANCISCO, CALIFORNIA.

FLUID SPEED-GOVERNING MECHANISM.

974,973. Specification of Letters Patent. Patented Nov. 8, 1910.

Application filed March 29, 1910. Serial No. 552,244.

*To all whom it may concern:*

Be it known that I, JULIUS C. W. JÖRGENSEN, a subject of the King of Denmark, and a resident of the city and county of San Francisco and State of California, have invented new and useful Improvements in Fluid Speed-Governing Mechanism, of which the following is a specification.

The invention relates to improvements in a fluid speed-governing mechanism designed to be arranged between the driving shaft and the driven shaft, to transmit motion to and govern the speed of the latter, within the range of the speed of the former.

The object of the invention is to provide a connecting mechanism between the driving and driven shafts, which acts as a speed transformer to vary the speed of the latter shaft.

Another object of the invention is to provide a mechanism adapted to act as a power absorber to consume the energy in a moving mass and bring it to rest.

A further object of the invention is to provide a mechanism adapted to operate as a clutch to positively transfer power from one shaft to another.

In general engineering practice the driving shaft is provided with a fly-wheel to preserve a constant velocity of the engine, and the apparatus of my invention is adapted to be secured to the fly-wheel or to be attached directly to the shaft. In many instances the mass of the mechanism will be sufficient to produce the required rotary effect and the fly-wheel may be dispensed with.

The mechanism consists of a casing which is attached to the driving shaft and rotates therewith. Within the casing and secured thereto is arranged a cylinder lying radially in the plane of rotation. A piston connected in a suitable manner to the driven shaft is arranged in the cylinder and is capable of reciprocating motion therein at right angles to the axis of the shaft, such reciprocation resulting from the rotary movement of the driving shaft. The casing is filled with a fluid such as oil, which enters the cylinder on both sides of the piston and is acted on by the moving piston.

The reciprocating motion of the piston is accomplished by means of a crank on the driven shaft to which the piston is connected. The centers of rotation of the piston and cylinder are therefore eccentric and the required reciprocating motion is obtained.

The cylinder in which the piston is mounted is open at both ends and is provided on one end with means for regulating the size of the opening and thereby the passage of the fluid to and from the end of the cylinder caused by the motion of the piston. When the passage-way for the fluid is closed or choked, the piston will not move freely in its cylinder and, consequently, the rotary motion of the driving shaft will be communicated to the driven shaft. The relative speed of the driven shaft is proportional to the freedom of movement of the piston, and when the passage way is fully closed the piston is held in the cylinder and the driven shaft is connected positively with the driving shaft, and consequently rotates at the same speed. When the passage is fully open, the driven shaft remains stationary, due to the load imposed on it, while the driving shaft may be rotated at full speed. The small increment of power exerted on the driven shaft due to the friction of the piston is not sufficient to move the shaft under even a slight load. The partial closure of the passage-way will impose restrictions upon the movement of the liquid displaced by the moving piston, and the driving shaft will drive the driven shaft at a speed depending on the degree of such restriction.

When the apparatus is used as a power absorber, or brake, the casing containing the cylinders is held stationary and the driven shaft is connected to the running gear that it is desired to bring to a stop. In this arrangement, the passageway is normally open and the piston allowed to reciprocate freely. As the passage-way is gradually closed, the restrictions placed on the liquid in the cylinder retard the motion of the piston and bring it to rest relative to the cylinder with a consequent stopping of the moving machinery or running gear.

To these objects the invention consists of a casing, a cylinder in the casing, a piston adapted to reciprocate in the cylinder and means for holding the piston against reciprocation to transfer the motion of the casing to the crank to which the piston is connected.

The following description explains at length the nature of my said improvements and the manner in which I proceed to apply the same in the production of a fluid speed-governing mechanism, reference being had to the drawings accompanying this specification.

Figure 1 is a front elevation partly in section of the mechanism of one embodiment of my invention, in which two oppositely arranged cylinders are employed, the mechanism being mounted on a fly-wheel. Fig. 2 is a cross-section of the form shown in Fig. 1, showing the means employed for operating the valves. Fig. 3 is a cross-sectional detail of one end of the casing showing the valve. Fig. 4 is a section taken on the line x—x, Fig. 3.

In the embodiment of my invention shown and described herein, I have employed two cylinders, but it is evident that the apparatus could be constructed with one or more cylinders according to the duty to which it is to be assigned. In the present construction the apparatus consists of a casing 2 arranged centrally on the driving shaft 4, and secured thereto by suitable bolts 3. The casing is provided with openings on the sides, covered with hand-hole plates 5 held securely in position by the bolts 6, which are adapted to be removed to allow access to the interior.

In the present construction the casing is shown of a rectangular shape at the center, having cylindrical portions 8 radiating therefrom. The outer ends of the cylindrical portions 8 are closed by the head-castings 7 provided with a screw-threaded portion 9, for engaging a similar thread on the inside face of the casing. The cylinders 12 are preferably formed integral with the head casting 7 and are formed of less diameter than the inside diameter of the cylindrical casing 8, to provide an annular ring or open space 13 around the cylinder 12. The inner ends of the cylinders 12 are open to allow the connecting rod 14 connecting the piston 15 with the crank pin 16 to have ample space for oscillating motion. The axis of the crank pin 16 is eccentric to the axis of the driving shaft 4, the amount of eccentricity determining the play of the piston 15 in the cylinder. The cylinders 12 revolve about the axis of the driving shaft 4 as a center and the pistons 15 revolve about the axis of the crank pin as a center, thereby producing two eccentric circles of rotation and causing the pistons 15 to reciprocate in the cylinders 12 as the apparatus is revolved. The crank is made a part of and preferably formed integral with the driven shaft 17, being connected thereto by the crank arms 18. The driven shaft 17 is loosely seated for rotation in the plate 19 which is securely bolted to the casing 2 and to the driving shaft 4. It is evident, therefore, that if the pistons 15 are allowed to reciprocate freely, the motion of the driving shaft 4 will not be transferred to the driven shaft 17. When, however, the motion of the piston is restricted, the rotary motion of the casing will be transferred to the driven shaft depending on the degree of restriction.

The casing 2 is completely filled with a fluid, preferably oil, which fills both sides of the piston chamber and which is transferred from one side of the chamber to the other by the motion of the piston 15. The outer end of the cylinder is provided with a port or passage-way 21 forming an opening between the outer piston chamber and the annular space 13, surrounding the cylinder. When this port 21 is open, the oil acting under the impulse of the piston, is allowed to move freely from one side of the piston chamber to the other and little pressure is exerted on the piston. If this passage way is restricted, however, it is evident that the oil will not be able to freely discharge from or enter into the outer piston chamber and a resulting pressure is exerted on the piston, from whence it is transferred to the crank and the driven shaft. When the passage way is entirely closed, the piston is held rigid in the cylinder, and the driving and driven shafts are constrained to rotate at the same speed.

As a means for regulating the size of the port-opening 21, I prefer to use a rotary valve 23, having a mutilated peripheral face, consisting of a concave depression 24, formed longitudinally therein. The span of the concave depression is made slightly longer than the arc of the port opening 21, so that the valve may be easily set for a full opening of the port. The port is made smaller in longitudinal dimension than the length of the valve, so that the valve will seat on the cylinder on all sides of the port and form a tight joint when the port is closed.

The valve 23 is keyed or pressed on to a shaft 25 extending through a packing gland 26 in the head casting 7 to the outside of the casing. The oil in the casing is under normal pressure when the casing is stationary, but during the revolution thereof, a high pressure is generated at the outer ends and packing-glands are necessary to prevent the escape of the oil.

Regulation of the valves 23 is obtained by means of a rack 28 meshing with the spur gear 29 keyed to the outer end of the shaft 25. The rack 28 is held in contact with the spur gear 29 by means of a guide plate or channel 31 secured to the packing screw 32, or journaled on the shaft 25. The longitudinal movement of the rods 28 is controlled by the lever 33, fulcrumed at a fixed point 34 and contacting with a loosely fitted grooved sleeve 35 on the driven shaft 17. Connecting levers 36, pivoted at 37 to the rods 38, are loosely connected to the sleeve 35 at one end and attached to the racks 28 at the other. During the operation of the device the complete mechanism and controlling elements rotate about the axis of the drive shafts with the exception of the control lever 33 which is stationary and fulcrumed at a fixed point. The sleeve 35 is normally held in position by a coiled spring 39 bearing on the face of the packing gland 40 which may be attached to the casing in any suitable manner.

In the operation of the mechanism, the ports 21 are opened wide and the engine started. The driving shaft and the casing are then free to revolve and the pistons reciprocate freely in the cylinders, no rotary motion being transferred to the driven shaft. The ports are then partially closed by the movement of the controlling lever 33, and the flow of the liquid in the cylinders is restricted, the motion of the pistons is impeded and the driven shaft is rotated at a velocity corresponding to the impedance. The ports are then gradually closed until the passage way has been choked, the pistons are held rigid and the driving and driven shafts rotate at the same speed. It is seen, therefore, that by gradually closing the ports the velocity of the driven shaft is slowly accelerated until it reaches the velocity of the driving shaft. When it is desired to stop the rotation of the driven shaft, the ports are opened and the driven shaft comes to rest under its load.

When it is desirable to use the mechanism as a brake or power absorber, the casing is rigidly mounted on a stationary support and the pistons are caused to reciprocate by the revolution of the shaft 17 which is connected to the mechanism to be halted. It is evident that as the motion of the pistons is impeded, power will be absorbed, and when the impedance becomes greater than the power the mechanism will come to a halt.

It is to be understood that I do not desire to limit myself to the construction shown and described, nor to the uses for which the mechanism is applicable as set forth herein, as it is evident that many changes could be made without varying from the spirit or scope of my invention, and that the device may be appropriated to other uses than to those specifically set forth. It is evident also that the mechanism would operate with the same degree of efficiency if the application of power was reversed and applied to the driven shaft instead of to the driving shaft. In this case the shaft 4 would remain stationary under its load as long as the cylinders were free to reciprocate and the shaft 17 would revolve. As the ports were gradually closed, the motion of the pistons would be impeded and power would be transferred to the shaft 4 depending on the degree of impedance.

I claim:

1. The combination with a driving and a driven shaft of a cylindrical housing mounted on one shaft, a cylinder of lesser diameter arranged within the housing, a piston engaging the cylinder and connected to the other shaft, a by-pass connecting the spaces in the cylinder on opposite sides of the piston and means for regulating the flow of a liquid through the by-pass.

2. The combination with a driving shaft and a driven shaft of a cylindrical housing mounted on one shaft and arranged to rotate in the plane of rotation thereof, a cylinder of lesser diameter than the housing arranged radially within the housing, a piston connected to the other shaft and engageing in the cylinder, and means within the cylinder for varying the area of the outlet passage to the interior of the housing.

3. The combination with a driving shaft and a driven shaft of a cylindrical housing mounted on one shaft and arranged at right angles thereto and adapted to rotate with the shaft, a cylinder of lesser diameter mounted within the chamber formed by the housing, the inner end of the cylinder opening into the chamber, a piston engaging the cylinder and connected to the other shaft and means within the cylinder for varying the size of the passage between the outer end of the cylinder and the chamber.

4. The combination with a driving shaft and a driven shaft, of a housing mounted on one shaft comprising a plurality of radially disposed cylindrical sections, a cylinder in each section of less diameter than the section, pistons engaging in the cylinders and connected to the other shaft, each pair of oppositely disposed pistons adapted to move in opposite directions radially, a by-pass connecting the opposite ends of the cylinders on each side of the pistons and means for varying the area of the by-pass.

5. The combination with a driving shaft and a driven shaft of a casing adapted to be filled with a fluid attached to one shaft, said casing comprising a central portion and oppositely arranged radial cylindrical portions, cylinders in the radial portions of less diameter than the diameter thereof, pistons connected to the other shaft and engaging in said cylinders, ports in the cylinders at the outer ends and valves arranged at said ports to vary the size of the opening between the cylinder and the casing.

6. The combination with a driving shaft and a driven shaft of a casing adapted to be filled with a fluid attached to one shaft, said casing comprising a central portion and oppositely arranged radial cylindrical portions, open end cylinders arranged in the radial portions, the diameter of the cylinders being less than the diameter of the casing, pistons engaging the cylinders and connected to the other shaft through said open ends, ports in the opposite ends of the cylinders, a rotary valve within the cylinder adapted to vary the area of the port and means external to the cylinder for operating the valves.

7. The combination with a driving shaft and a driven shaft of a casing adapted to be filled with a fluid attached to one shaft, said casing comprising a central portion and oppositely arranged radial cylindrical portions, cylinders in the radial portion of less diameter than the diameter of the casing, piston engaging in the cylinders, and connected to the other shaft, ports in the outer ends of the cylinders, a rotary valve within the cylinder adapted to vary the area of the port, and means for operating the valves comprising valve rods extending through the casing provided with pinions on the outer ends, racks engaging the pinions, and means for producing a simultaneous motion of the racks.

JULIUS C. W. JÖRGENSEN.

Witnesses:
H. G. PROST,
P. S. PIDWELL.